(12) United States Patent
Tseng et al.

(10) Patent No.: US 7,036,937 B2
(45) Date of Patent: May 2, 2006

(54) ILLUMINATING DEVICE REUSING POLARIZED LIGHT

(75) Inventors: Chi-Xiang Tseng, Hsinchu (TW); Chun-Chuan Lin, Hsinchu (TW); Hsin-Hsiang Lo, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 12 days.

(21) Appl. No.: 10/854,229

(22) Filed: May 27, 2004

(65) Prior Publication Data

US 2005/0134803 A1    Jun. 23, 2005

(30) Foreign Application Priority Data

Dec. 19, 2003 (TW) .............................. 92136332 A

(51) Int. Cl.
*G03B 21/14* (2006.01)
*G03B 21/26* (2006.01)
*G03B 21/20* (2006.01)
*G02F 1/1335* (2006.01)

(52) U.S. Cl. .................. 353/20; 353/30; 353/102; 349/9

(58) Field of Classification Search .......... 353/20, 353/31, 33, 34, 37, 84, 97, 98, 102, 121, 353/30; 349/9; 348/744, 758, 761, 790; 359/485, 497, 486

See application file for complete search history.

(56) References Cited

U.S. PATENT DOCUMENTS

| | | | | |
|---|---|---|---|---|
| 5,748,376 A | * | 5/1998 | Lin et al. | ..................... 359/629 |
| 6,231,193 B1 | * | 5/2001 | Sugawara | ................... 353/102 |
| 6,523,977 B1 | * | 2/2003 | Chuang et al. | ............. 362/231 |
| 6,739,723 B1 | * | 5/2004 | Haven et al. | .................. 353/20 |
| 6,795,243 B1 | * | 9/2004 | McGettigan et al. | ........ 359/486 |

FOREIGN PATENT DOCUMENTS

TW            119661 A         8/1987

* cited by examiner

*Primary Examiner*—Melissa Jan Koval
(74) *Attorney, Agent, or Firm*—Birch, Stewart, Kolasch & Birch, LLP

(57) ABSTRACT

An illuminating device reusing polarized light uses an elliptical mirror, a cylindrical optical channel tube, a polarized light converter and at least two lenses to evenly distribute light and convert polarized light effectively. The incident end of the cylindrical optical channel tube is located at one focal point of the elliptical mirror. The emerging light from the cylindrical optical channel tube enters into the polarized light converter to form an image on the illuminated display panel.

15 Claims, 4 Drawing Sheets

ILLUMINATING DEVICE REUSING POLARIZED LIGHT

This Non-provisional application claims priority under 35 U.S.C. § 119(a) on Patent Application No. 092136332 filed in Taiwan on Dec. 19, 2003, the entire contents of which are hereby incorporated by reference.

FIELD OF INVENTION

This invention relates to an illuminating device reusing polarized light that is applicable to the micro liquid-crystal-display (LCD) panel of projecting systems, and in particular, an illuminating device reusing polarized light that contains a cylindrical optical channel tube.

BACKGROUND OF THE INVENTION

The light condenser or integrator used in LCD projectors harmonizes the beam and the source and converts the circular screen into a 4:3 or 16:9 rectangular screen. FIG. 1A and FIG. 1B show two common integrators.

As shown in FIG. 1A, the first array of lenses 20 divides the light beam from the light source 10 into multiple of 4:3 or 16:9 rectangular blocks and forms an image on the second array of lenses 30; then the second array of lenses 30 projects the image formed by the first array of lenses onto the display panel 40. In FIG. 1B, the light beam from light source 10 passes through the cylindrical glass integrator 25; emerges onto lens 35; and projects onto the display panel 40.

Most of the liquid crystal projectors (LCP's) use the characteristics of the polarized light to adjust the luminous intensity. However, this method has its disadvantages. To adjust the luminous intensity, only a certain direction of the polarized light from the light source 10 is illuminated. Thus, the rest of the polarized light energy is unused. Therefore, one of the effective solutions to improve the efficiency of the liquid crystal projector's luminous intensity is to reuse the energy of the previously unused polarized light.

Due to the restriction of the second law of thermodynamics, since the scattering angle and light radiated area increases when an unpolarized light is polarized, the resolution of the LCP decreases. Since increasing the light radiated area can cause problems for small LCP's, where a small arc length for the light source is preferred, instead of decreasing the area of the light beam, increasing the area of the light beam can also effectively polarize the light beam while the resolution of the LCP is maintained.

To overcome the problem mentioned above, a cylindrical integrated polarization converter was disclosed (R.O.C. Patent number 119661). By placing the incident surface of the cylindrical glasses at one focal point of the elliptical mirror, the light beam passes through the cylindrical glass and emerges to the converging lens and polarized light converter, to form an image on the display panel with appropriate light illumination. However, in a real application, an image array will be formed on the second lens. This makes the incident angle of the image array big and the size of the image array is not matched with the gap between the image array and the polarized light converter. As a result, the efficiency of the conversion of the polarized light is low and is unable to achieve the desired result.

SUMMARY OF THE INVENTION

To solve the aforementioned problem, this invention discloses an illuminating device reusing polarized light to fully use the energy provided by the light source to increase the illumination efficiency and decrease the number of lenses, which lowers manufacturing costs.

This invention of an illuminating device reusing polarized light comprises a light source, cylindrical optical channel tube, front lens, rear lens, and polarized light converter. The light source is located at the focal point of an elliptical mirror while the other focal point is located at the light emerging side of the cylindrical optical channel tube. The light evenly emerges from the light emerging side of the cylindrical optical channel tube to form an array of virtual light at the incident side of the cylindrical optical channel tube. By using the front lens, the array of virtual light forms an array of real optical images at the polarized light converter, which then converts the array of real optical images into a plurality of particular polarized light that is projected to the rear lens so that more particular polarized light overlaps at the display panel.

This invention not only increases the effectiveness of the optical system, it also reuses the wasted energy of the polarized light. This invention also converts the light beam from the light source into two polarized light beams so that the light radiated area doubles, while the luminous intensity is halved.

Further scope and possible applications of this invention will become apparent from the detailed description given hereinafter. However, it should be understood that the detailed description and specific examples, while indicating preferred embodiments of the invention, are given as illustrations only, and changes and modifications are allowed by those skilled in the art as long as the spirit and scope of this invention are maintained.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1A:
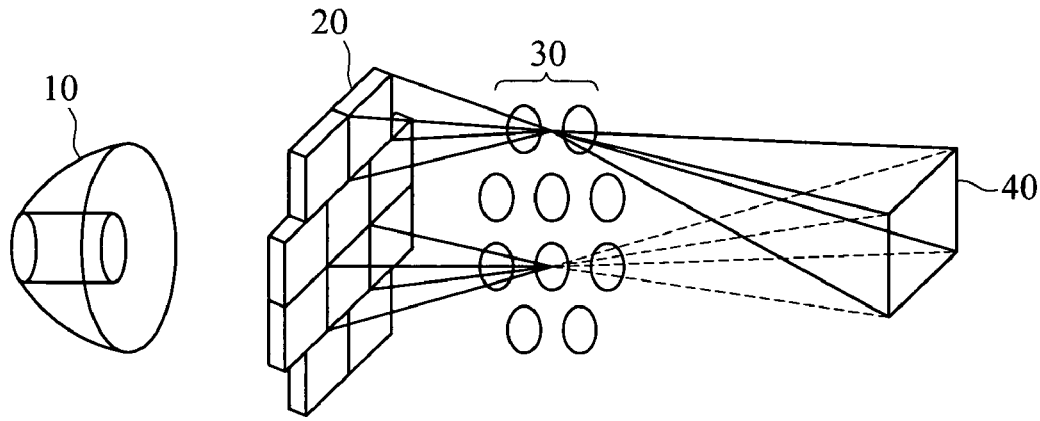
FIGS. 1A and 1B illustrate prior art light-illuminating devices.
Figure 1B:
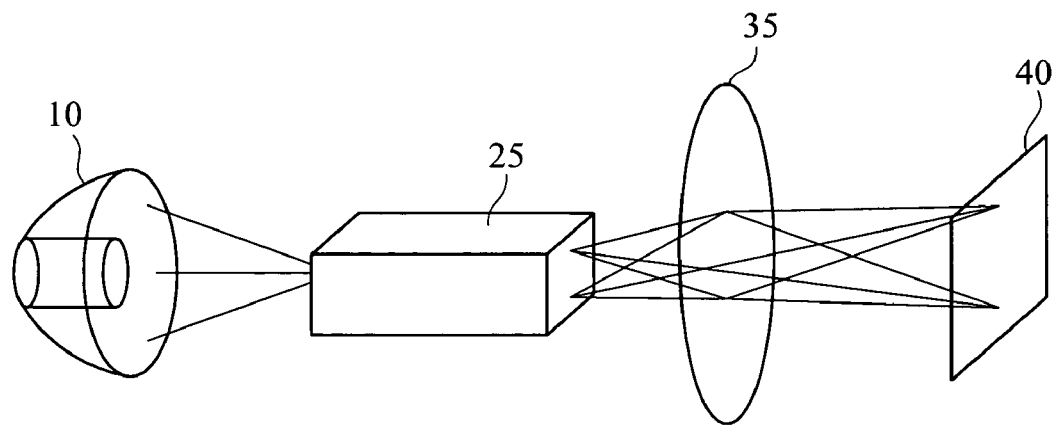
Figure 2:
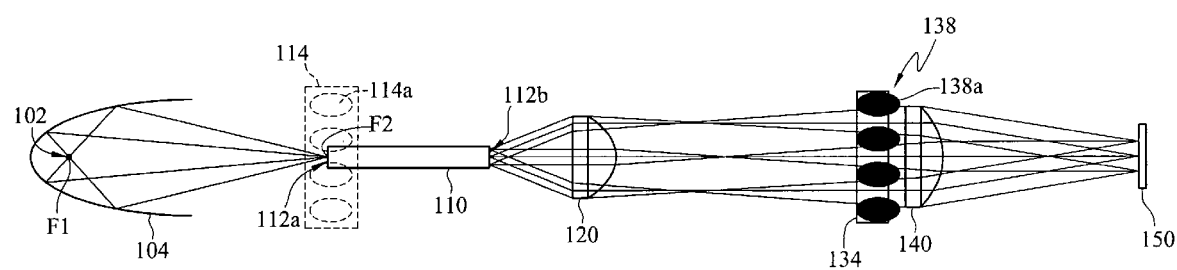
FIG. 2 illustrates the structure of the present invention.

As shown in FIG. 2, an illuminating device reusing polarized light comprises a light source 102, cylindrical optical channel tube 110, front lens 120, rear lens 140, and polarized light converter 134. The light source 102 is located at the first focal point, F1, of the elliptical mirror 104 and uses the geometry of the elliptical mirror 104 to reflect the light beam from F1 to F2. The light source 102 can be a halogen lamp or any kind of arc lamp such as a UV lamp, metal halide lamp, xenon lamp, LED and or any similar lamp that provides enough luminance intensity.

The two ends of the cylindrical optical channel tube 110 are an incident end 112a and an emerging end 112b. The incident end 112a is located at the second focal point F2 of the elliptical mirror 104 and receives the light beam from the light source 102. When the light from the light source 102 at the first focal point F1 reflects from the elliptical mirror 104 to the second focal point F2, it enters the cylindrical optical channel tube 110 from the incident side 112a.

Total internal reflection occurs when the light beam is inside the cylinder optical channel tube 110 and an array of virtual optical images 114 is formed at the incident end 112a. Since the incident angle is different every time, the light beam enters the cylindrical optical channel tube 110, and total internal reflection may occur several times inside the cylindrical optical channel tube 110. By tracing the path of the light beam every time, total reflection occurs inside the cylindrical optical channel tube 110 and a virtual image is formed. Hence, an array of virtual optical images 114 would be formed on an incident end 112a. Each virtual light source 114a of the array of virtual optical images 114 illuminates on the emerging end 112b by different angles, and by the kaleidoscope effect the intensity of the light on the emerging end 112b is uniform according to its positions.

Front lens 120 is located outside the emerging end 112b of the cylindrical optical channel tube 110. Front lens 120 forms an array of real optical images 138, by projecting every light beam of the array of virtual optical images 114 onto the polarized light converter 134 (referring to FIG. 3), where the light point and scattering angle are at their minimum (the best condition to polarize light.)

Figure 3:
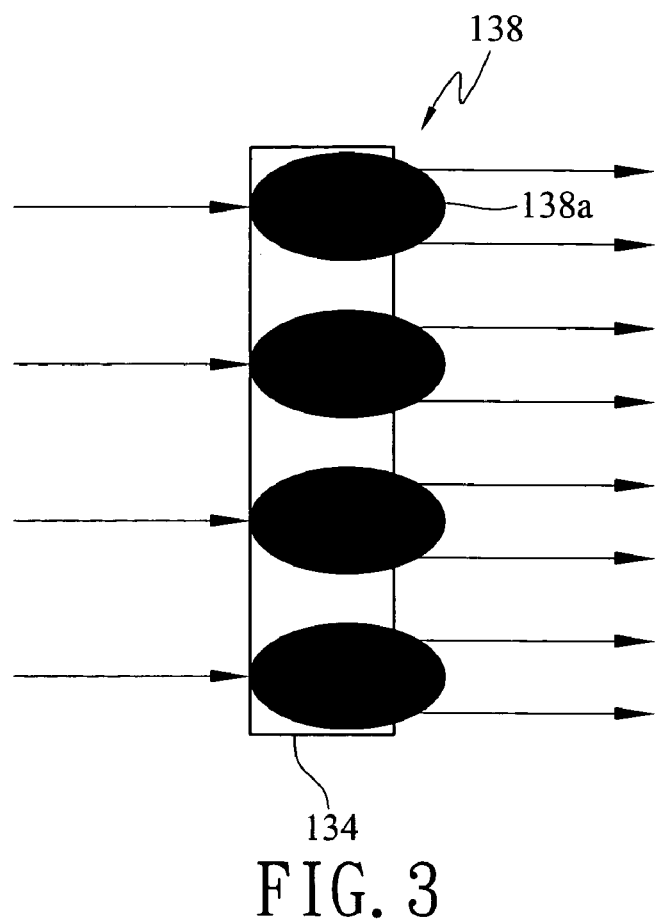
FIG. 3 illustrates the array of real optical images converting into beams of polarized light.

Polarized light converter 134 is used to convert unpolarized light into polarized light that the display panel 150 will accept, such as P polarized light. As shown in FIG. 3, all light beams 114a of the array of virtual optical images 114 together form an array of real optical images 138 on the polarized light converter 134. The polarized light converter 134 then separates every light beam 138a of the array of real optical images 138 into P polarized light and S polarized light, and further converts every beam of S polarized light to P polarized light (when the display panel only accepts P polarized light), so that the effectiveness of the projecting system increases.

Figure 4:
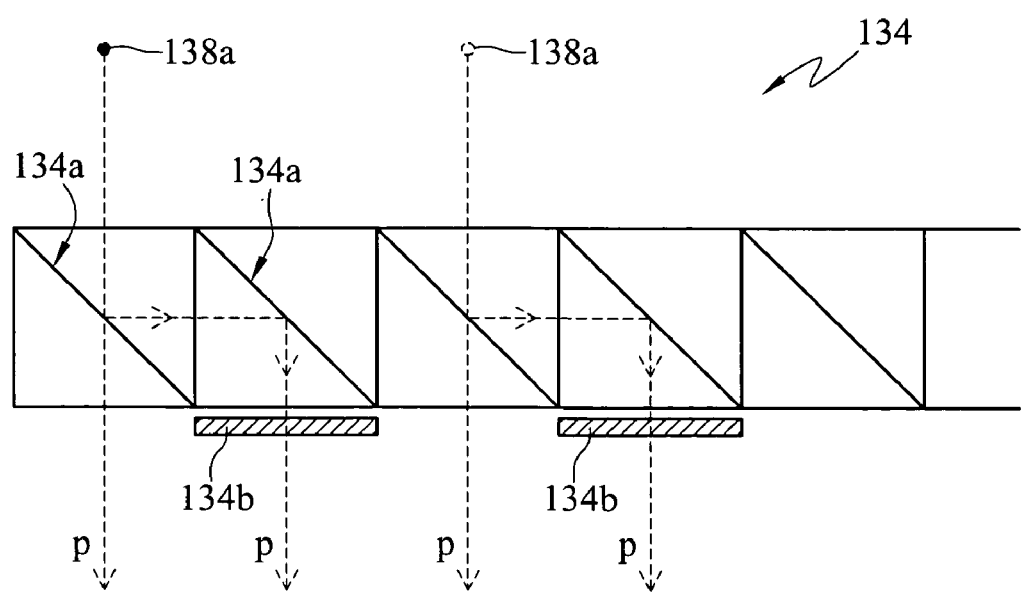
FIG. 4 illustrates the principle of the polarized light converter.

Referring to FIG. 4, a polarized light converter 134 is made of a plurality of polarized light splitters 134a and a plurality of half-wave plates 134b. All polarized light splitters 134a are tilted at an angle, such as 45° and parallel to each other, while one half-wave plate 134b is placed between every two polarized light splitters 134b. Please note that the polarized light splitter 134a has a coating layer which permits a certain type of polarized light, P polarized light for example, and reflects others, S polarized light in this example.

When one of the light beams 138a of the array of real optical images 138 reaches the polarized light splitter 134a after entering the polarized light converter 134, the S polarized light is reflected while the P polarized light passes through the converter. The reflected S polarized light is reflected again by the next polarized light splitter 134a, to enter one of the half-wave plates 134b, which converts the S polarized light into P polarized light. As shown in FIG. 4, since the polarized light converter 134 separates one of the light beams 138a into two polarized lights, the light radiated area doubles while the luminous intensity halves.

Meanwhile, all the light beams that emerge from the polarized light converter 134 are P polarized light and they converge after passing the rear lens 140 to have the polarized lights of real images 138a overlapping with each other on the display panel 150.

Figure 5A:
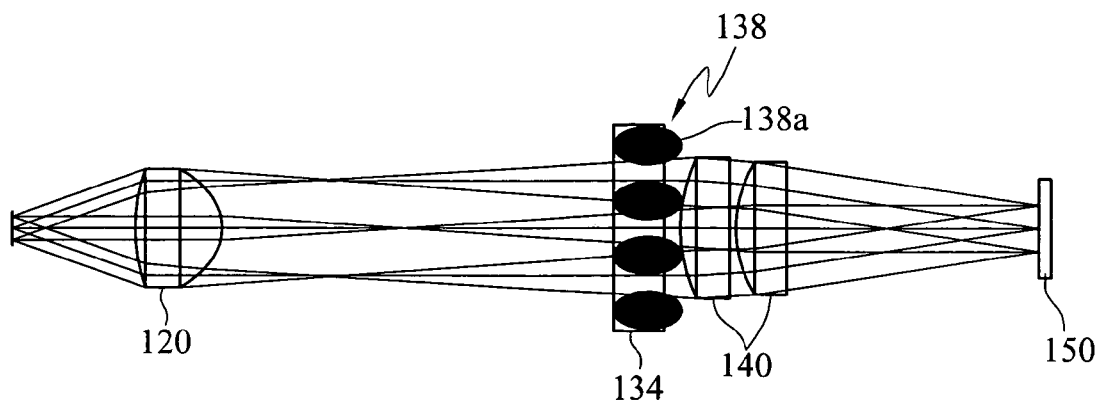
FIGS. 5A~5C illustrate the preferred embodiments of this invention.
Figure 5B:
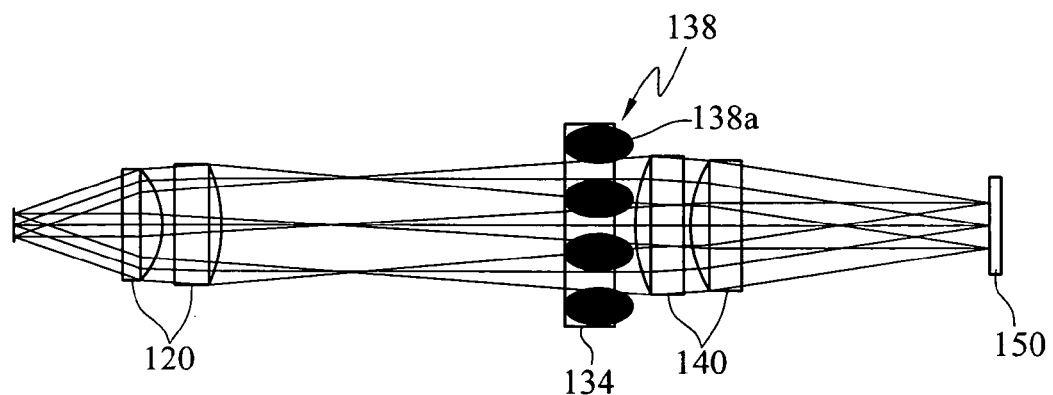
Figure 5C:
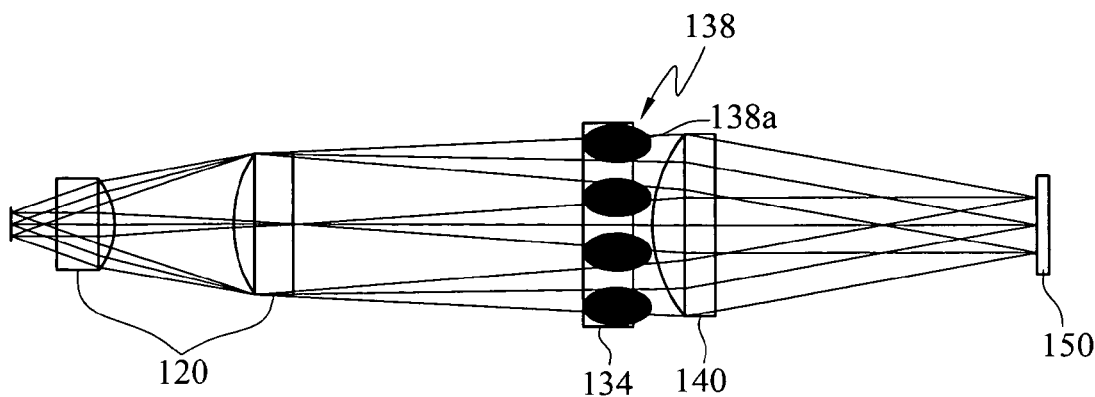

The front lens 120 controls the f number of the array of virtual optical images 114 formed on the polarized light converter 134 (when the f-number is greater than 5.5, the converting efficiency of the polarized light is higher.) The rear lens 140 controls the f-number and light distribution from this device to the display panel 40. The smaller the f-number of the illuminating device is, the larger the intensity of light on the display panel 140 and the larger the incident angle. However, the contrast of the image would be decreasing. Moreover, the rear lens can effectively reduce the aberration caused by lights with larger angle and far away from the axial, and hence, makes better uniformity. Both the front lens 120 and rear lens 140 can be replaced with non-spherical lenses (as shown in FIG. 2), so that the structure as a whole is simple; yet, the manufacturing cost is actually higher. It is possible to replace one of the lenses with two spherical lenses; for example, as shown in FIG. 5A, the front lens 120 is replaced with two spherical lenses, or the rear lens 140 is replaced with two spherical lenses as shown in FIG. 5B. Another option to lower the manufacturing cost is to replace both the front lens 120 and rear lens 140 with two spherical lenses (a total of four spherical lenses) as illustrated in FIG. 5C. On the other hand, an array of lenses can also be added between the front lens 120 and polarized light converter 134 to slightly increase the effectiveness.

Nevertheless, this invention has a polarized light converter where both the light point and scattering angle are at the minimum. Thus, this invention not only successfullly converts the unpolarized light into polarized light, it also effectively uses the energy from the light source to increase the effectiveness of the illuminating device. Furthermore, unlike the prior art, this invention controls the f-number of the array of virtual images on the polarized light converter (when f-number is greater than 5.5, the converting efficiency increases to achieve a ratio more than 85%.); and by the Telecentric the polarized converter has better endurance. Moreover, the rear lens controls the f-number of the illuminating device and the light distribution of the display panel so that the beams of light can be converted effectively.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An illuminating device reusing polarized light to illuminate a display panel, comprising:

a light source, located at one focal point of an elliptical mirror;

a cylindrical optical channel tube, having an incident end and an emerging end, another focal point of said elliptic mirror being located at said incident end, said incident end receiving beams of light from said light source and emerging a well-distributed beam of light from said emerging end to form an array of virtual optical images at said incident end;

a front lens, located outside of said emerging end of said cylindrical optical channel tube to form an array of real optical images by projecting said array of virtual optical images;

a polarized light converter, located at a side of said front lens to receive said array of real optical images and transforms said array of real optical images into a plurality of particular polarized light a rear lens, located between said polarized light converter and said display panel to overlap said particular polarized light onto said display panel.

2. The illuminating device reusing polarized light according to claim 1, wherein said polarized light converter further comprises a plurality of polarized light splitters and a plurality of half-wave plates, while said plurality of polarized light splitters are tilted at an angle and parallel to each other with said half-wave plates therein between.

3. The illuminating device reusing polarized light according to claim 2, wherein said polarized light splitter has multi-layers of coating.

4. The illuminating device reusing polarized light according to claim 2, wherein said angle is 45 degrees.

5. The illuminating device reusing polarized light according to claim 1, wherein said light source is a xenon lamp.

6. The illuminating device reusing polarized light according to claim 1, wherein said light source is a halogen lamp.

7. The illuminating device reusing polarized light according to claim 1, wherein said light source is a UV lamp.

8. The illuminating device reusing polarized light according to claim 1, wherein said light source is a metal halide lamp.

9. The illuminating device reusing polarized light according to claim 1, wherein said light source is a LED.

10. The illuminating device reusing polarized light according to claim 1, wherein said front lens includes at least one lens while said rear lens include at least one lens.

11. The illuminating device reusing polarized light according to claim 10, wherein said front lens and said rear lens are non-spherical lenses.

12. The illuminating device reusing polarized light according to claim 10, wherein said front lens is a non-spherical lens while said rear lens includes two spherical lenses.

13. The illuminating device reusing polarized light according to claim 10, wherein said front lens includes two spherical lenses while said rear lens is a non-spherical lens.

14. The illuminating device reusing polarized light according to claim 10, wherein said front lens and rear lens both include two spherical lenses, respectively.

15. The illuminating device reusing polarized light according to claim 1, wherein said cylindrical optical channel tube has a rectangular cross-section.

* * * * *